(12) United States Patent
Pantalone

(10) Patent No.: US 7,783,771 B2
(45) Date of Patent: *Aug. 24, 2010

(54) NETWORK COMMUNICATION DEVICE FOR UNIVERSAL PLUG AND PLAY AND INTERNET MULTIMEDIA SUBSYSTEMS NETWORKS

(75) Inventor: Brett A. Pantalone, Pittsboro, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 799 days.

This patent is subject to a terminal disclaimer.

(21) Appl. No.: 11/313,011

(22) Filed: Dec. 20, 2005

(65) Prior Publication Data

US 2007/0143489 A1 Jun. 21, 2007

(51) Int. Cl.
G06F 15/16 (2006.01)
G06F 15/177 (2006.01)
G06F 15/173 (2006.01)
H04L 12/28 (2006.01)
H04L 12/48 (2006.01)

(52) U.S. Cl. .................. 709/230; 709/201; 709/202; 709/221; 709/227; 709/229; 709/238; 709/248; 370/351; 370/352; 370/401

(58) Field of Classification Search .................. 709/230, 709/201, 202, 221, 227, 229, 238, 248; 370/352, 370/401
See application file for complete search history.

(56) References Cited

U.S. PATENT DOCUMENTS

| | | | |
|---|---|---|---|
| 6,788,676 B2 | 9/2004 | Partanen et al. | |
| 6,910,068 B2 | 6/2005 | Zintel et al. | |
| 6,931,453 B2 | 8/2005 | Aarnos et al. | |
| 7,290,132 B2 * | 10/2007 | Aboba et al. | 713/153 |
| 2002/0103898 A1 * | 8/2002 | Moyer et al. | 709/224 |
| 2003/0217136 A1 | 11/2003 | Cho et al. | |
| 2004/0085949 A1 | 5/2004 | Partanen et al. | |
| 2004/0187021 A1 | 9/2004 | Rasanen | |
| 2005/0071455 A1 | 3/2005 | Collins | |
| 2005/0240758 A1 | 10/2005 | Lord et al. | |

(Continued)

FOREIGN PATENT DOCUMENTS

EP  1 603 047 A  12/2005

(Continued)

OTHER PUBLICATIONS

SIP Center, "SIP Signaling", Nov. 28, 2005, pp. 1-3.

(Continued)

*Primary Examiner*—Wing F Chan
*Assistant Examiner*—David Yi
(74) *Attorney, Agent, or Firm*—Renner, Otto, Boisselle & Sklar, LLP

(57) ABSTRACT

A device and method for seamlessly internetworking local area networks utilizing the Universal Plug and Play protocol with wide area networks utilizing the Internet Protocol Multimedia Subsystem architecture. The network communication device includes a universal plug and play (UPnP) interface and an Internet Protocol multimedia subsystem (IMS) interface. Circuitry is communicatively coupled to the UPnP interface and the IMS interface, wherein the circuitry associates an UPnP session key with an associated electronic equipment for allowing communication between the one or more associated devices and the associated electronic equipment.

13 Claims, 3 Drawing Sheets

U.S. PATENT DOCUMENTS

| | | | |
|---|---|---|---|
| 2006/0123116 A1* | 6/2006 | Rahman et al. | 709/227 |
| 2006/0136987 A1* | 6/2006 | Okuda | 726/1 |
| 2006/0140199 A1* | 6/2006 | Ma et al. | 370/401 |
| 2006/0153072 A1 | 7/2006 | Bushmitch et al. | |
| 2006/0245403 A1* | 11/2006 | Kumar | 370/338 |
| 2007/0217408 A1* | 9/2007 | Sahashi et al. | 370/389 |

FOREIGN PATENT DOCUMENTS

| | | |
|---|---|---|
| WO | 02/49276 | 6/2002 |
| WO | 2005/104586 A | 11/2005 |

OTHER PUBLICATIONS

Fout, Tom, "Universal Plug and Play in Windows XP", Jul. 1, 2001, pp. 1-25.

Johansson, Rolf, "Converging Requirements on the Residential Gateway", Oct. 6, 2005, pp. 1-18.

Contributing Members of the UpnP™ Forum, "UpnP™ Device Architecture", Jun. 8, 2000, pp. 1-52.

Consumer: The Connected Home; Jun. 2005; Figure 1.

International Preliminary Report on Patentability for International Application No. PCT/US2006/029755 dated Jul. 3, 2008.

Meddahi A. et al., "Enabling secure third party control on wireless home networks" Applications and Services in Wireless Networks, 2004. ASWN 2004. IEEE Aug. 2004, pp. 46-54.

International Search Report and Written Opinion for International Application No. PCT/US2006/029755 dated Dec. 6, 2006.

International Search Report and Written Opinion for International Application No. PCT/US06/29756 dated Nov. 23, 2006.

* cited by examiner

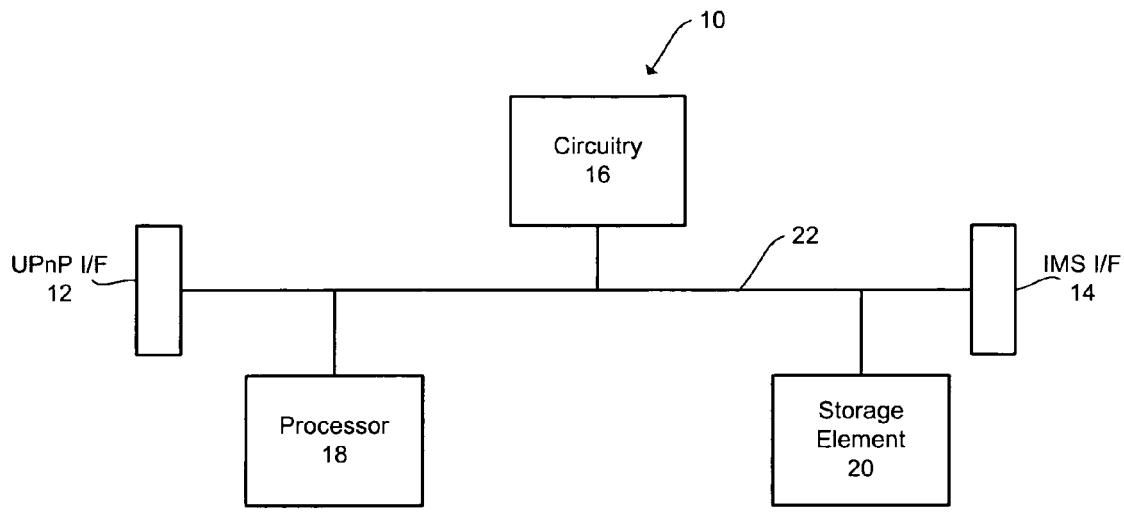
Figure 1
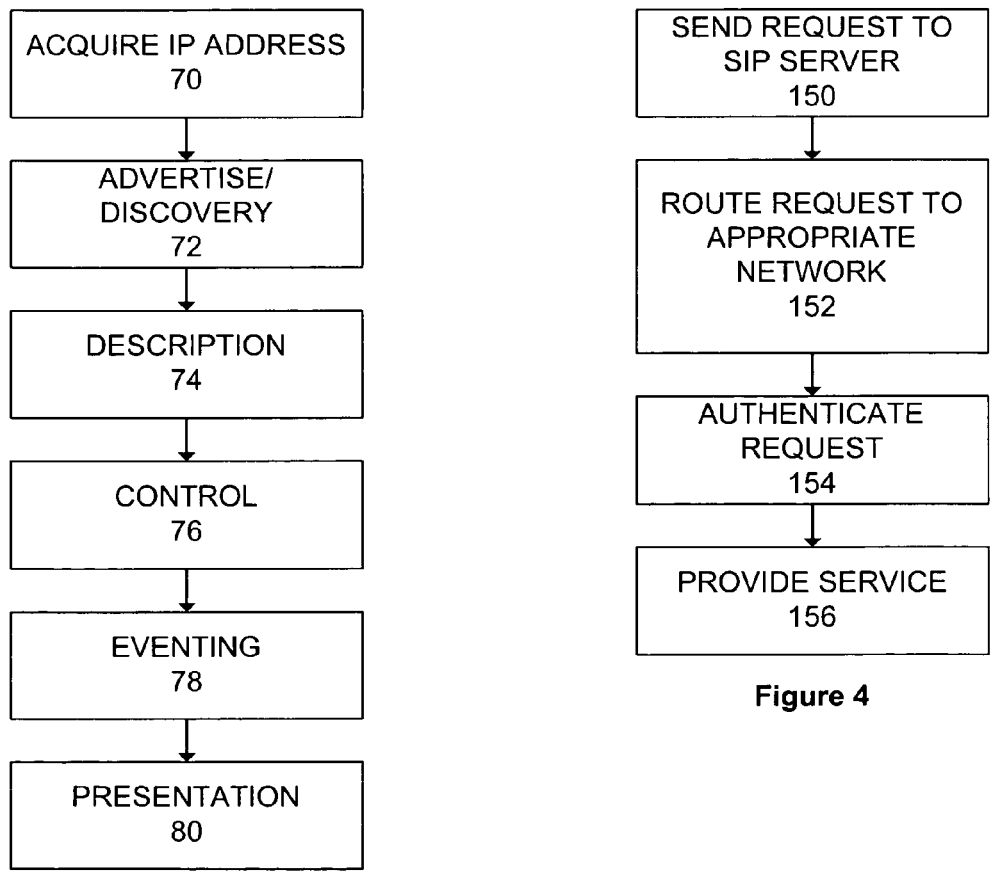
Figure 3
Figure 4

NETWORK COMMUNICATION DEVICE FOR UNIVERSAL PLUG AND PLAY AND INTERNET MULTIMEDIA SUBSYSTEMS NETWORKS

TECHNICAL FIELD OF THE INVENTION

The present invention relates to a device and method for seamlessly internetworking local area networks utilizing the Universal Plug and Play protocol with wide area networks utilizing the Internet Multimedia Subsystem architecture.

DESCRIPTION OF THE RELATED ART

The Universal Plug and Play (UPnP) architecture is directed to peer-to-peer networking of intelligent appliances, wireless devices, and computers of varying form factors. UPnP defines a set of common protocols that devices use to join a network and describe themselves and their capabilities, which enables other devices and people to use them without setup or configuration. UPnP is a distributed, open networking architecture that utilizes TCP/IP to enable seamless proximity networking in addition to control and data transfer among networked devices in a local area network environment (e.g., a home network, office network, etc.). Networking, in this context, describes a style of connectivity that enables any networked device to initiate a communication with any other networked device, without having established a prior relationship or maintaining a persistent relationship between the devices. Networking also allows multiple devices to establish one or more connections with a single device, and it allows for a device to be capable of both initiating and accepting connections to/from other networked devices. In other words, UPnP makes it possible to initiate and control the transfer of bulk information (e.g. files, images, multimedia, movies, content, songs, MP3's, audiovisual data streams, etc.) from any device on the network, to any device on the network, under the control of any device on the network. UPnP also enables the ad hoc addition or removal of devices on the network, and it enables multiple controlling devices to remain in sync with each other.

While UPnP enables multiple networked devices to share services and multimedia content, there are numerous drawbacks associated with UPnP. One drawback is that UPnP is not easily expandable outside of the local home network. Another drawback is that non-UPnP devices are unlikely to receive service advertisements, commands and messages necessary for proper operation in a local home network utilizing UPnP. Another drawback is non-UPnP devices are unlikely to be properly authenticated in an UPnP environment. Still another drawback with UPnP is proximity detection which permits the source to refuse content to a device if a maximum round-trip time is exceeded.

SUMMARY

Often times, it is desirable for authorized users of a local network to obtain secure access to the network even when the user is located geographically outside of the network and when the authorized user is attempting to obtain access to services and/or information located on the home network through a device that does not support the UPnP protocol. Thus, a strong need exists for a network communication device (also referred to herein as an interworking device) that is operable to access and share services and multimedia content associated with the local home network to an authorized user located geographically outside of the local home network and/or attempting to obtain access to such services and/or information through a device that does not support directly the UPnP protocol.

One aspect of the present invention relates to a network communication device comprising: a universal plug and play (UPnP) interface for transmitting and receiving information related to one or more associated devices connected to an associated local area network, wherein at least a portion of the associated local area network utilizes a UPnP protocol; an Internet Protocol multimedia subsystem (IMS) interface for transmitting and receiving information related to an associated electronic equipment registered to an associated wide area network, wherein at least a portion of the associated wide area network utilizes an IMS protocol; and circuitry communicatively coupled to the UPnP interface and the IMS interface, wherein the circuitry associates a UPnP session key with an associated electronic equipment for allowing communication between the one or more associated devices and the associated electronic equipment.

Another aspect of the present invention relates to a method for communication, the method comprising: obtaining a first unique address in a local area network, wherein the local area network includes one or more associated devices utilizing a UPnP protocol; obtaining a second unique address in a wide area network, wherein the wide area network includes one or more devices utilizing an IMS protocol; receiving a request for information from an associated electronic equipment for access to one or more of the associated devices on the local area network; authenticating the request; establishing a session key related to the request for information; and associating the session key with an associated electronic equipment for allowing communication between the one or more associated devices and the associated electronic equipment.

Another aspect of the present invention relates to a program stored on a machine readable medium, the program being suitable for use in a network communication device for associating a UPnP session key with an associated electronic equipment for allowing communication between the one or more associated devices and the associated electronic equipment, wherein; when the program is loaded in memory in the network communication device and executed, causes seamless exchange of information between the one or more associated devices and the associated electronic equipment.

According to another aspect, the communication network device is registered on the local area network.

According to another aspect, the communication network device is also registered on the wide area network.

According to another aspect, the UPnP interface receives and transmits signals from at least one of the associated devices through a wireless medium.

According to another aspect, the wireless medium is selected from the group consisting of Bluetooth, wireless local area network or infrared.

According to another aspect, a security circuitry is coupled to the circuitry to prevent unauthorized users from accessing the one or more associated devices.

According to another aspect, the circuitry converts a format associated with information stored on the one or more of the associated devices to another format for operation on the associated electronic equipment.

According to another aspect, the step of obtaining a first unique address in a local area network is an IP address associated with the local area network.

According to another aspect, the step of obtaining a second unique address in a wide area network is an IP address associated with the wide area network.

According to another aspect, further including translating at least a portion of the information requested from the one or more associated devices for use on the associated electronic equipment.

According to another aspect, the step of translating includes translating an address associated with the one or more associated devices to an second address for use on the associated electronic equipment.

According to another aspect, including transmitting at least a portion of the information requested from the one or more associated devices to the associated electronic equipment.

According to another aspect, including encrypting at least a portion of the information requested.

According to another aspect, including parsing the request to determine a requested service desired by the associated electronic equipment.

According to another aspect, wherein the first unique address is an IP address.

According to another aspect, wherein the second unique address is an IP address.

According to another aspect, including converting a format associated with information stored on the one or more of the associated devices to another format for operation on the associated electronic equipment.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

The term "electronic equipment" includes portable radio communication equipment. The term "portable radio communication equipment", which herein after is referred to as a mobile radio terminal, includes all equipment such as mobile telephones, pagers, communicators, i.e., electronic organizers, personal digital assistants (PDA's), portable communication apparatus, smart phones or the like.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIG. 1 is an exemplary block diagram of a network communication device in accordance with aspects of the present invention.

FIG. 3 is an exemplary flow chart in accordance with aspects of the present invention.

FIG. 4 is an exemplary flow chart in accordance with aspects of the present invention.

DETAILED DESCRIPTION OF EMBODIMENTS

Figure 2:
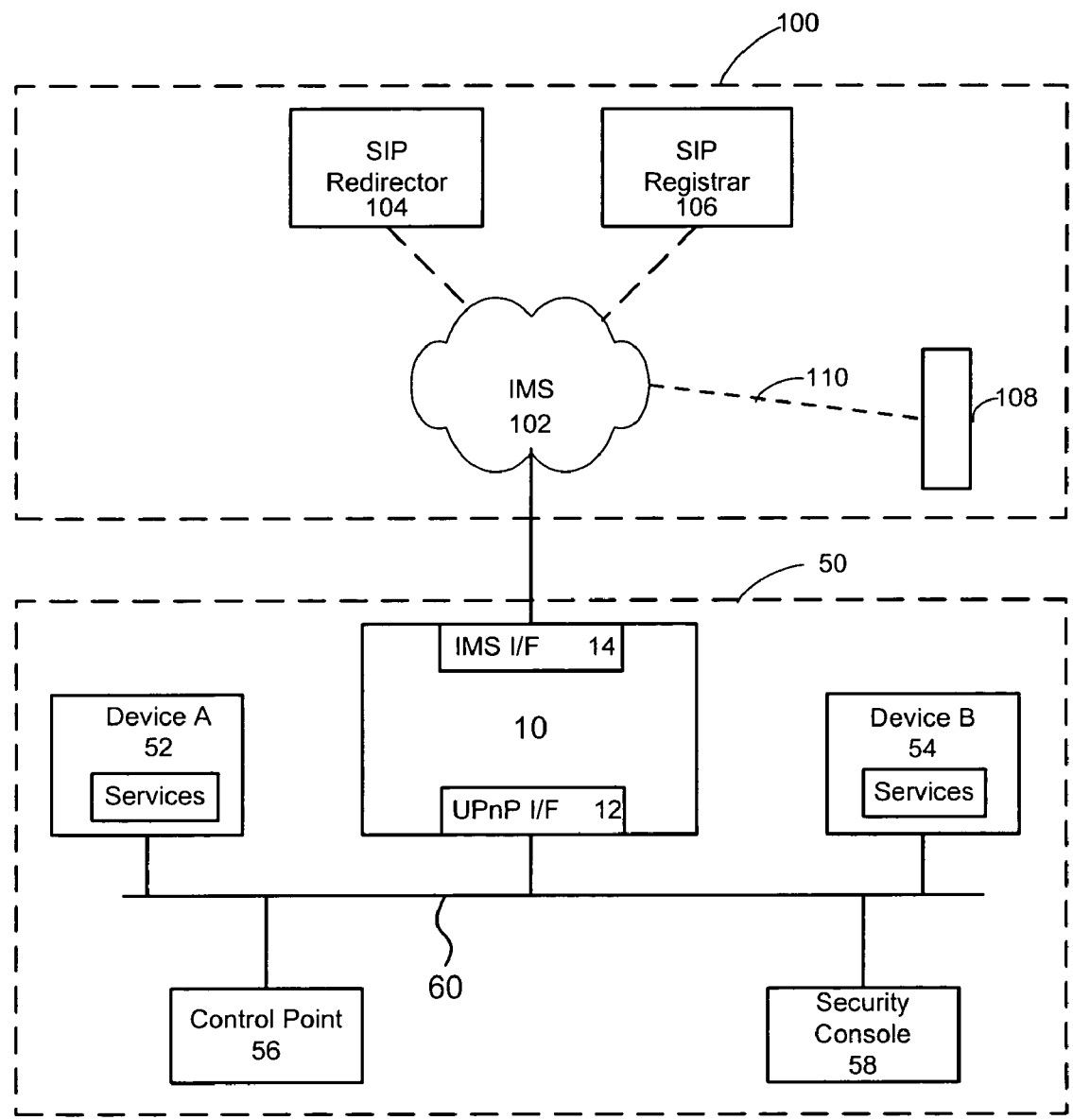
FIG. 2 is an exemplary configuration of the network communication device in accordance with aspects of the present invention.

The present invention is directed to a network communication device and method for exchanging information between one or more devices on a local area network utilizing a universal plug and play (UPnP) protocol and an associated electronic equipment utilizing an Internet Protocol Multimedia Subsystem (IMS) protocol on a wide area network.

As shown in FIG. 1, a network communication device 10 includes a first interface 12, a second interface 14, circuitry 16, a processor 18, a storage element 20 and a data bus 22. The network communication device 10 may recognize devices and/or control points in an UPnP local area network and/or is recognized by one or more control points in an UPnP local area network. The network communication device 10 is capable of exchanging information between one or more devices on the UPnP local area network. In addition, the network communication device 10 also typically is registered on a wide area network that utilizes the IMS protocol, which enables the network communication device 10 to communicate with and an associated electronic equipment connected to the wide area network utilizing the IMS protocol. The network communication device 10 enables electronic equipment or other devices compatible with the IMS protocol to join a UPnP local area network (also referred to herein as a local home network and UPnP home network) by associating session keys with the associated electronic equipment and providing network address translation services between the signals associated with the UPnP local area network and the IMS wide area network. The network communication device 10 allows electronic equipment and other devices compatible with the IMS protocol to control devices on the UPnP home network and share information (e.g. files, images, multimedia, movies, content, songs, MP3's, audiovisual data streams, etc.) with the electronic equipment, just as if the electronic equipment were directly present on the UPnP local area network.

The first interface 12 may be any suitable device, component, subcomponent and the like that can transmit and receive signals in a local area network environment. For example, the first interface 12 may be a network interface card, an access point, a port, a router, etc., which is capable of connecting the network communication device 10 to an UPnP network. As used herein, the phrases "UPnP network", "UPnP local home network" and "UPnP home network" mean a local area network having one or more devices that utilize one or more UPnP-compatible protocols. The first interface 12 may utilize any medium for such communications. Suitable media include, for example, wired media (e.g., Ethernet, USB, twisted pair, coaxial cable) or wireless media (e.g., wireless local area network, Bluetooth, infrared, radio frequency and the like) or any combination of wired or wireless media.

The second interface 14 may be any suitable device, component, subcomponent and the like that can transmit and receive IMS signals over a wide area network. As used herein, the phrases "IMS network" and "IMS wide area network" mean a wide area network having that utilizes one or more IMS-compatible protocols. For example, the second interface 14 may include a network interface card, an access point, a port, a router, etc., which is capable of connecting the network communication device 10 to the IMS wide area network. Typically, the second interface 14 can transmit and receive signals over a wide area network with one or more of the following exemplary communication links: a cable modem, DSL, a modem, a router, a wireless base station and the like. In one embodiment, the communication link to the wide area network is separate and distinct from the network communication device 10. In another embodiment, the communication link to the wide area network is integral within the housing for the network communication device 10.

The circuitry 16 is communicatively coupled to the first interface 12 and the second interface 14 typically through a data bus 22. The circuitry 16 is operable to facilitate communication between one or more devices located on the local area network and an electronic equipment connected to the wide area network. Typically, the circuitry 16 is capable of associating session keys with the associated electronic equipment and providing network address translation services between the signals associated with the UPnP local area network and the IMS wide area network. The circuitry 16 is capable of translating at least a portion of a received and/or transmitted signal from the first interface 12 to a suitable format for use with the electronic equipment or other IMS-compatible device. The circuitry 16 also is capable of translating at least a portion of a received and/or transmitted signal from the second interface 14 to a suitable format for use by one or more devices associated with the local home network. In addition, circuitry 16 also may allow format conversion between devices connected through the network communication device 10. For example, if an electronic device on the local home network stores a particular image in one format (e.g., JPEG) and the electronic equipment requests the image to be sent in another format (e.g., Tiff), circuitry 16 is capable of transmitting the image in the requested format to the electronic equipment.

The term "circuitry" as used herein should be given its broadest meaning and includes hardware, firmware, software, or any combination thereof, which performs all or a portion of the functions described herein. The circuitry 16 may include one or more logical operations grouped together or separated physically and/or electronically.

As shown in FIG. 1, the network communication device 10 also includes one or more storage elements 20 (e.g., RAM, ROM, hard disk, buffers, etc.) capable of storing software, translation algorithms and/or information and/or perform additional tasks as needed. The processor 18 is programmed to communicate with the components of the network communication device 10 in order to perform the functionality described herein.

Referring to FIG. 2, an exemplary configuration of the network communication device 10 is shown communicatively coupled to a UPnP local area network 50 and an IMS wide area network 100. The UPnP local area network 50 and the IMS wide area network 100 are discussed in detail below.

The UPnP device architecture defines the protocols for communication between nodes of the UPnP network 50. Generally, there are two types of nodes on a UPnP network: (1) a control point is a client node that sends commands and (2) a device receives commands and provides services. A physical component can contain both control points and devices. An exemplary UPnP network 50 is illustrated in FIG. 2. The UPnP network 50 generally includes at least one device, a control point and optionally, a security console. As illustrated in FIG. 1, the UPnP network 50 includes devices 52 and 54, control point 56 and optional security console 58 connected through a communication medium 60.

In the UPnP local area network 50, a device is generally considered a container of services and nested devices. A device (e.g., devices 52, 54) typically contains information about itself and the services it hosts. This information is generally organized as an Extensible Markup Language (XML) document. Typically, every device employs a mini web server to communicate this information to control points and other devices on the UPnP local area network 50. When a device (e.g., device 52) connects to the UPnP local area network 50, it typically can automatically get a network address (e.g., an IP address), advertise its presence, describe its services, and learn about other connected devices (e.g., device 54). Once connected to the UPnP network 50, the device can talk directly to other devices in peer-to-peer fashion.

By itself, a device is generally not considered useful in the UPnP network environment unless it provides a service to other nodes on the UPnP network 50. Services can perform actions or provide information. A service generally is not a stand-alone entity, but typically is hosted by a container device, as illustrated in FIG. 2 (e.g., 52A and 54A). Typically, every service implements a web server that publishes an XML document. The XML document typically lists all actions supported by the service, along with specific inputs, outputs, and calling conventions. The XML document typically describes the capabilities of the service in detail, including any proprietary extensions of the standard type. A control server, also typically contained in each device, handles incoming action requests, and a state table stores the current value of all internal variables. These values can be polled by external nodes, or exported by an event server whenever a value changes.

As shown in FIG. 2, the UPnP network 50 includes a control point 56. Control point 56 is a component of the UPnP network 50 that is able to discover, interrogate, and control devices (e.g., devices 52 and 54) on the UPnP network 50. Control point 56 typically listens to a designated network port for identification of connected devices. Using the UPnP discovery protocol, control point 56 can also initiate its own search for a specific device or type of service. Once a control point 56 has discovered a device (e.g., device 52), the control point 56 may retrieve the device's description, get a list of services, call service actions, or subscribe to service events. Control point 56 can be a stand-alone component, or it can be embedded within a container device. Devices containing an embedded control point can utilize services running on other connected devices. Control point 56 usually will have some kind of user interface (e.g., a display, user input devices, hardware, etc.) for user interaction, which allows the control device 56 to be used as a status panel and/or "remote control" for any connected UPnP device, such as devices 52 and 54, for example.

Generally, when allowing remote users access to information, it is desirable to include a security mechanism to prohibit unauthorized access to information. In UPnP, the security console 58 controls access to the information stored on the UPnP network 50. In addition, the security console 58 may also provide communication encryption services.

As stated above, UPnP devices advertise themselves via a discovery protocol and offer services, which is, for example, collections of simple object access protocol (SOAP) actions that the control points invoke. The security console 58 utilizes the SOAP control protocol and secures SOAP control messages and replies. SOAP control messages generally include: identification, integrity, authentication, freshness, authorization and secrecy. One of ordinary skill in the art will readily appreciate that the level of security provided by any given security console will vary based on application.

The network medium 60 can be any type of medium (e.g., wired, Ethernet, USB, wireless, infrared, radio frequency, etc.) or any combination thereof. Generally, the network medium 60 is capable of supporting a variety of protocols, including Transport Control Protocol/Internet Protocol (TCP/IP) and related addressing.

As stated above, network communication device 10 may recognize devices and/or control points in an UPnP local area network and/or is recognized by one or more control points on the UPnP network 50. Depending on the particular application, the network communication device 10 may be registered as a device or a control point. The term "registered" as used specifically with UPnP devices means that a device is recognized by one or more control points in the UPnP network and/or a control point recognizes one or more devices and/or control points on the UPnP network. In addition, the network communication device 10 may also include a built-in security console or utilize an associated security console. The network communication device may also include firewall services.

FIG. 3 illustrates an exemplary method of adding network communication device 10 to the UPnP network 50. At Step 70, the network communication device 10 acquires an IP address. Typically, the network communication device 10 has a Dynamic Host Configuration Protocol (DHCP) client (not shown) and searches for a DHCP server when the device is first connected to the UPnP network 50. If a DHCP server is available, the device 10 typically uses the IP address assigned. If no DHCP server is available, the device 10 may use Auto IP (automatic IP) function to get an IP address. As one of ordinary skill in the art will appreciate, Auto IP defines how a device intelligently chooses an IP address from a set of reserved addresses and is able to move easily between managed and unmanaged networks. Once the device 10 obtains an IP address and a domain name, e.g., through a DNS server or via DNS forwarding, the device 10 typically uses that name in subsequent network operations or its assigned IP address.

Given an IP address, the UPnP discovery protocol allows the device 10 to advertise its services to control points (e.g., control point 56) on the UPnP network 50, as illustrated at Step 72 in FIG. 3. Likewise, when a control point is added to the network, the UPnP discovery protocol allows that control point to search for devices on the network. The device 10 typically advertises its services by multicasting a number of discovery messages advertising its embedded devices and services. Any interested control point can listen to the standard multicast address for notifications that new capabilities are available. Generally, all devices listen to the standard multicast address for these messages and respond if any of their embedded devices or services match the search criteria in the discovery message.

The discovery process allows control points (e.g., control point 56) to find devices on the UPnP network 10. The discovery process enables description protocol, as illustrated at Step 74 in FIG. 3, where control points learn about device capabilities. After a control point has discovered a device (e.g., device 10), the control point 56 still knows very little about the device 10. For the control point 56 to learn more about the device 10 and its capabilities, or to interact with the device 10, the control point 56 typically retrieves the device's description from the uniform resource locator (URL) provided by the device 10 in the discovery message. Device 10 may contain other information, for example, logical devices, as well as functional units, or services. The UPnP description for a device is typically partitioned into two, logical parts: a device description describing the physical and logical containers, and one or more service descriptions describing the capabilities exposed by the device. As stated above, the UPnP description for a device is expressed in XML and includes vendor-specific, manufacturer information like the model name and number, serial number, manufacturer name, URLs to vendor-specific Websites, etc. The description also includes, for example, a list of any embedded devices or services, as well as URLs for control, eventing, and presentation services discussed below. For each service, the description typically includes a list of the commands, or actions, the service responds to, and parameters, or arguments, for each action; the description for a service also includes a list of variables; these variables model the state of the service at run time, and are described in terms of their data type, range, and event characteristics.

Retrieving an UPnP device description for the network communications device 10 may occur by the control point 56 issuing an HTTP GET request on the URL in the discovery message. In such cases, the device 10 may return the device description. Retrieving an UPnP service description is a similar process that uses a URL within the device description. Typically, as long as the discovery advertisements from device 10 have not expired, control point 56 may assume that the device 10 and its services are available. The device and service descriptions may be retrieved at any point since the device and service descriptions are static as long as the device and its services are available. If device 10 cancels its advertisements, control point 56 must assume the device and its services are no longer available to the other devices associated with the UPnP network 50. If device 10 needs to change one of its descriptions, it must cancel its outstanding advertisements and re-advertise with the updated description to the other devices and control points on the UPnP network 50.

After control point 56 has retrieved a description of the device 10, the control point 56 can send actions to the device's service (not shown). To do this, the control point 56 sends a suitable control message to the control URL for the service (provided in the device description), as illustrated at Step 76. Control messages are expressed in XML using Simple Object Access Protocol (SOAP). Like function calls, in response to the control message, the service returns any action-specific values. The effects of the action, if any, are modeled by changes in the variables that describe the run-time state of the service. Given knowledge of device 10 and its services, control point 56 can generally request those services to invoke actions and the control point 56 can poll those services for the values of their state variables. Invoking actions is a pseudo remote procedure call; control point 56 typically sends the action to the device's service, and when the action has completed (or failed), the service returns any results or errors. When these state variables change, events are published to all interested control points. To determine the current value of a state variable, a control point may poll the service. Similar to invoking an action, a control point sends a suitable query message to the control URL for the service. In response, the service provides the value of the variable; each service is responsible for keeping its state table consistent so control points can poll and receive meaningful values.

As stated above, an UPnP description for a service includes a list of actions that the service responds to and a list of variables that model the state of the particular service at run time. The service publishes updates when these variables change, and control point 56 typically subscribes to receive this information. The service publishes updates by sending event messages, as depicted in Step 78 of FIG. 3. Event messages contain the names of one of more state variables and the current value of those variables. These messages are also expressed in XML and typically formatted using the General Event Notification Architecture (GENA). A special initial event message may be sent when a control point 56 first subscribes; this event message contains the names and values for all evented variables and allows the subscriber to initialize its model of the state of the service. To support scenarios with multiple control points, eventing is designed to keep all control points equally informed about the effects of any action. Therefore, all subscribers are sent all event messages, subscribers receive event messages for all evented variables that have changed, and event messages are sent no matter why the state variable changed (either in response to a requested action or because the state the service is modeling changed).

After control point 56 has discovered device 10 and retrieved a description of the device and its services, the control point has the essentials for the eventing protocol. As stated above, a UPnP service description includes a list of actions the service responds to and a list of variables that model the state of the service at run time. If one or more of these state variables are evented, then the service publishes updates when these variables change, and control point 56 may subscribe to receive this information. To subscribe to eventing, control point 56 generally transmits a subscription message. If the subscription is accepted, the publisher responds with a duration for the subscription. To keep the subscription active, a subscriber must renew its subscription before the subscription expires.

If a device 10 has a URL for presentation, as depicted in Step 80, then the control point 56 can retrieve a page from the URL, load the page into a browser, and depending on the capabilities of the page, allow a user to control the device 10 and/or view device status. One of ordinary skill in the art will readily appreciate that the degree to which each of these functions can be implemented depends on the specific capabilities of the presentation page and device 10 and are often a design choice. After control point 56 has discovered device 10 and retrieved a description of the device 10, the control point 56 is ready to begin presentation. The URL for presentation is typically contained within the presentation URL element in the device description. The device description is generally delivered via a description message. To retrieve a presentation page, the control point 56 issues an HTTP GET request to the presentation URL, and the device 10 returns a presentation page.

Once the device 10 has been added to the UPnP network 50, any UPnP enabled device (e.g., devices 52 and 54) or control point (e.g., control point 56) located on the local UPnP network 50 may access or otherwise control the device 50.

Referring back to FIG. 2, a wide area network (WAN) 100 also is illustrated. The WAN 100 includes is an IMS architecture 102, SIP entities (e.g., SIP redirector server 104, SIP proxy server (not shown), SIP registrar 106, etc.). The WAN 100 generally allows one or more electronic equipment 108 to communicate with other electronic equipment (not shown), the Internet, and/or other computer networks (e.g., local area network 50) as described herein. The communication link 110 from the electronic equipment 108 to the WAN 100 may span over a single network or different networks such as, for example, a Public Land Mobile Network, one or more transit networks and a terminating network. The electronic equipment 108 may be any device or user terminal to allow a user to access to network services, including for example, a remote server or mobile station for GSM as defined in 3GPP TS 24.002, V5.0.0, Release 5 and later releases.

IMS architecture 102 generally utilizes a standardized protocol designed for enabling peer-to-peer content sharing between WAN devices (e.g. electronic equipment, mobile telephones, personal digital assistants (PDAs), communicators and the like). IMS uses open standard IP (Internet Protocol) protocols, so that a multimedia session may be established between a variety of user devices and/or applications regardless of geographical location. For example, IMS allows multimedia sessions to be established between two IMS devices, between an IMS device and a device connected to the Internet, and between two devices connected to the Internet using the same protocol. Thus, IMS allows widespread device interoperability regardless of the location of the IMS device and destination source.

IMS is an extension of the PS (packet-switched) Core Network (CN) of UMTS (Universal Mobile Telecommunications System) and is independent of the PS-CN. IMS uses the Session Initiation Protocol (SIP) to set up, maintain and terminate voice and multimedia sessions. SIP is a part of the overall Internet Engineering Task Force (IETF) multimedia data and control architecture. SIP is used in conjunction with other IETF protocols, such as the Session Description Protocol (SDP) and the Real-Time Protocol (RTP). SIP is a signaling protocol that provides a variety of functions, for example, handling the setup, modification, and teardown of multimedia sessions. SIP in combination with the protocols with which it is used, also describes the session characteristics of a communication session to potential session participants. Typically RTP is used to exchange media (e.g., audio, voice or data) during the communication session, but SIP allows any transport protocol to be used. SIP messages (signaling) also typically pass through some of the same equipment as the media to be exchanged during a communication session.

As shown in FIG. 2, the WAN 100 includes one or more SIP entities. Typical SIP entities include, for example, SIP redirector server 104, SIP registrar server 106, and SIP proxy server (not shown). A SIP redirector server is utilized to provide user mobility. A SIP redirector server accepts SIP requests and returns zero or more new addresses that should be contacted to fulfill the request. In contrast, a SIP proxy server will forward the request to the new address that should be contacted to fulfill a particular request. A SIP registrar server 106 is a device that stores the "logical" location of user agents within a domain or sub-domain, an SIP registrar server stores the location of user agents and dynamically updates data via REGISTER messages received from the user agents.

One of ordinary skill in the art will readily appreciate that the use of a SIP redirector or a SIP proxy server may be used interchangeably and the use of one over the other in no way limits the scope of the present invention. Because of the use of multiple services (e.g., proxy and redirector servers) in SIP, often times it is desirable to maintain a logical separation between SIP signaling and the communication of the media (the session data).

FIG. 4 illustrates a request for information (or services) from an electronic equipment 108. This example assumes that the electronic equipment 108 is already registered on the IMS network (e.g., the electronic equipment is a subscriber and entitled to access the IMS network and/or the device has sent a REGISTER method to an associated SIP registrar server). At Step 150, in order to initiate a session, the requestor (or User Agent Client) sends a request with the SIP URL of the network to be contacted. If the client knows the IP address of the network to be contacted, the request may be sent directly to known IP address; if not, typically the destination IP address may be resolved by a lookup of the SIP URL in the registrar server.

At step 152, the SIP network server will attempt to resolve the requested network's IP address and send the request to the network. One of ordinary skill in the art will readily appreciate that there are many ways to perform such functionality. For example, searching the DNS or accessing databases for the requested network's IP address. Alternatively, the server may be a redirect server that may return the called user location to the calling client for it to try directly. During the course of locating a user, one SIP network server can proxy or redirect the call to additional servers until it arrives at one that definitely knows the IP address where the called user can be found. At Step 154, once the network IP address is found, the request is sent to the destination network for authentication. At Step 156, the destination address provides the requested information and/or services.

The commands that SIP uses are called methods. SIP defines the following methods: INVITE—invites a user to a call; ACK—used to facilitate reliable message exchange for INVITEs; BYE—terminates a connection between users or declines a call; CANCEL—terminates a request, or search, for a user; OPTIONS—solicits information about a server's capabilities; REGISTER—registers a user's current location; and INFO—used for mid-session signaling.

Typical SIP responses include: 1xx Informational (e.g. 100 Trying, 180 Ringing), 2xx Successful (e.g. 200 OK, 202 Accepted), 3xx Redirection (e.g. 302 Moved Temporarily), 4xx Request Failure (e.g. 404 Not Found, 482 Loop Detected), 5xx Server Failure (e.g. 501 Not Implemented), 6xx Global Failure (e.g. 603 Decline), etc. For purposes of clarity, provisional (1xx) responses have been omitted. The precise route taken by the ACK, and any later in-call signaling may vary because by the time the two user agents have exchanged INVITE and 200 OK messages they potentially know each others actual destinations and the ACK could be sent directly end-to-end. However, SIP allows any of the proxy servers to insist on remaining in the signaling path for the entire session if desired.

Figure 5:
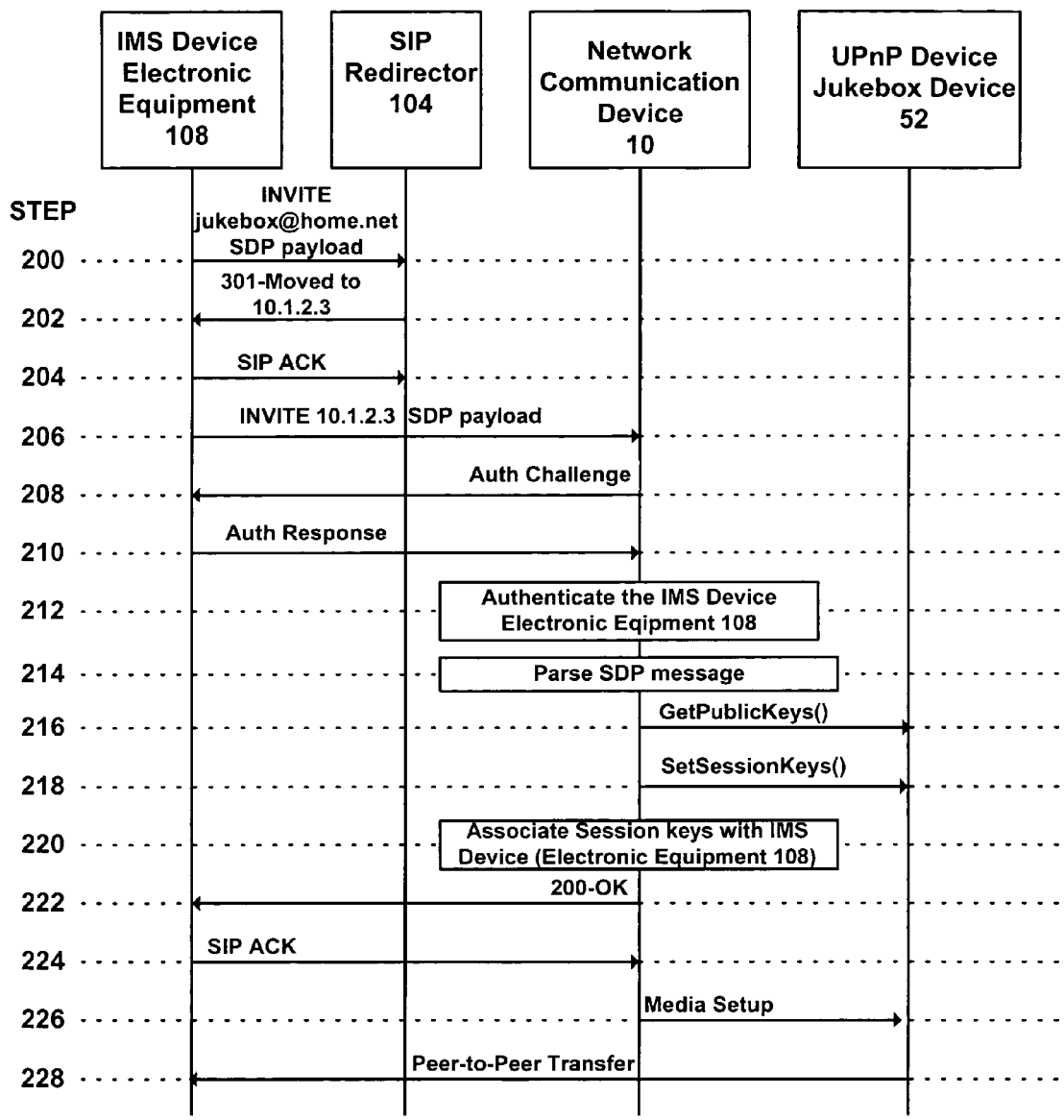
FIG. 5 is an exemplary signaling method in accordance with aspects of the present invention.

FIG. 5 illustrates an exemplary method of operation for network communication device 10 to enable seamless communication between one or more UPnP devices on the local home network 50 and the electronic equipment 108 communicatively coupled to the IMS wide area network 100. In this example, a user desires to use electronic equipment 108 to access a jukebox device (e.g., device 52) on the UPnP local network 50 and stream music from the jukebox device to the electronic equipment. The following assumptions have been made in the example that follows: 1) both the electronic equipment 108 and the network communication device 10 are registered with a SIP server; and 2) the electronic equipment 108 (or other IMS device) and the network communication device 10 maintain a shared secret for authentication purposes (e.g., http digest procedure).

In this example, the user knows the SIP URL for the network communication device 10. As shown at Step 200, the user utilizes the electronic equipment to send an INVITE message to a SIP redirector server. For example, the request may read: INVITE jukebox@home.net to the local SIP redirector server. The request may include a SDP payload field, which may specify, for example, negotiation parameters, services requested, format of information, etc. In this particular example, the SIP redirector server is utilized. One of ordinary skill in the art will readily appreciate that a proxy server may also be used in accordance with the present invention, instead of or in addition to a redirector server.

At step 202, the redirector server, in turn, sends the message 301-Moved to 10.1.2.3, which indicates the device associated with jukebox@home.net may be found at the IP address 10.1.2.3. At Step 204, the electronic equipment 108 sends an ACK message to the SIP redirector server indicating that the 301-Moved message was received.

At Step 206, the electronic equipment 108 transmits an INVITE message to the network communication device, which is located at IP address 10.1.2.3. As stated above, the INVITE message typically includes a SDP payload field, for negotiating various parameters between electronic equipment device 108 and the network communication device 10.

At Step 208, the network communication device 10 challenges the authentication of the electronic equipment 108 attempting to gain access to the local home network 50. At Step 210, the electronic equipment 108 transmits a suitable authentication response to the network communication device. At Step 212, the electronic equipment 108 has been authenticated by the network communication device 10, meaning that the device is authorized to access the UPnP network 50. One of ordinary skill in the art will readily appreciate that if the electronic equipment 108 transmitted an invalid response (or provided an identifier that did not have proper access rights to the UPnP network 50, the authentication process would typically fail at this point and the electronic equipment 108 would not be given access to the UPnP network 50.

At Step 214, the network communication device 10 parses the SDP message transmitted by the electronic equipment 108. The network communication device 10 determines based on the message, what UPnP services were requested.

At Step 216, the network communication device 10 having an UPnP security console integrated in the device, requests encryption information from the desired UPnP device (e.g. device 52). At step 216, the public keys from the desired UPnP device (e.g., the jukebox in this example) are obtained using a GetPublicKeys( ) remote procedure call. At Step 218, the security console associated with the network communication device 10 sends a SetSessionKeys( ) remote procedure call to the desired UPnP device 52 (e.g., the jukebox device) located on the UPnP home network. Once the session keys are obtained, data encryption is enabled. In one embodiment, the session keys may be forwarded to electronic equipment 108 for end to end data encryption (e.g., from the device 52 to the to network communication device 10 and from the network communication device 10 to the electronic equipment 108).

At Step 220, the session keys are associated with the IMS device (e.g., the electronic equipment 108). Since the IMS device (e.g. electronic equipment 108) is not in physically located in the UPnP network, the network communication device 10 associates the session key with the IMS device. The network communication device 10 is the only device on the UPnP network that has knowledge that the caller (e.g., the electronic equipment 108) is not located on the UPnP network 50. The network communication device 10 makes association so that when UPnP device 52 (e.g., the jukebox device) attempts to form a connection to the controlling device, the network communication device 10, translates it into a suitable IMS protocol form (e.g. contains the proper address), which is transferred to the requesting IMS device (e.g., electronic equipment 108).

At Step 222, the network communication device 10 transmits a 200-OK message to the electronic equipment 108 indicating that the SDP message was in the proper format. At Step 224, the electronic equipment 108 responds to the network communication device 10 with an SIP ACK message, thereby acknowledging receipt of the 200-OK message.

Based on the desired services contained in the SDP message, the network communication device 10 will send a media setup message to the jukebox, as shown in Step 226. In Step 226, the network communication device 10 determines which services the electronic equipment 108 desires. The network communication device 10 converts the message to an UPnP control message and sends the message to the UPnP network device 52 (e.g., the jukebox). In turn, the UPnP device 52 connects to the network communication device 10 and provides the desired service (e.g., stream audio). The electronic equipment 108 now has a connection to the UPnP home network through the network communication device 10 and the UPnP device has the address of the electronic equipment 108 so that the devices an talk directly to each other in a peer-to-peer relationship as shown in Step 228. Steps 200-228 are generally repeated whenever a new session is started.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

What is claimed is:

1. A network communication device comprising:
a universal plug and play (UPnP) interface for transmitting and receiving information related to one or more associated devices connected to an associated local area network, wherein at least a portion of the associated local area network utilizes a UPnP protocol and the network communication device is registered on the associated local area network by obtaining a first unique address in the associated local area network;
an Internet Protocol multimedia subsystem (IMS) interface for transmitting and receiving information related to an associated electronic equipment registered to an associated wide area network, wherein at least a portion of the associated wide area network utilizes an IMS protocol and the network communication device is registered on the associated wide area network by obtaining a second unique address in the associated wide area network; and
circuitry communicatively coupled to the UPnP interface and the IMS interface, wherein when a request for information is received from the associated electronic equipment for access to one or more of the associated devices on the associated local area network, authenticating the request by one or more associated devices on the associated local area network, wherein a UPnP session key related to the request for information wherein the UPnP session key is generated by one or more associated devices on the associated local area network, the circuitry associates the UPnP session key with an associated electronic equipment to establish a communication session between the one or more associated devices and the associated electronic equipment and the circuitry provides network address translation to facilitate communication between the one or more associated devices on the associated local area network and the one or more associated electronic equipment on the associated wide area network.

2. The network communication device of claim 1, wherein the UPnP interface receives and transmits signals from at least one of the associated devices through a wireless medium.

3. The network communication device of claim 2, wherein the wireless medium is selected from the group consisting of Bluetooth, wireless local area network or infrared.

4. The network communication device of claim 1, further including security circuitry coupled to the circuitry to prevent unauthorized users from accessing the one or more associated devices.

5. The network communication device of claim 1, wherein the circuitry converts a format associated with information stored on the one or more of the associated devices to another format for operation on the associated electronic equipment.

6. A program stored on a non-transitory machine readable medium, the program being suitable for use in a network communication device for associating a UPnP session key with an associated electronic equipment to establish a communication session between the one or more associated devices and the associated electronic equipment, wherein;
when the program is loaded in memory in the network communication device and executed, causes the network communication device to register on a local area network by obtaining a first unique address in the local area network, wherein at least a portion of the associated local area network utilizes a UPnP protocol and register on a wide area network by obtaining a second unique address in the wide area network, wherein at least a portion of the associated wide area network utilizes an IMS protocol, and receives a request for information from the associated electronic equipment for access to one or more of the associated devices on the local area network, authenticating the request by one or more associated devices on the local area network, wherein a UPnP session key related to the request for information wherein the UPnP session key is generated by one or more associated devices on the local area network, to facilitate an exchange of information between the one or more associated devices available on the local area network and the associated electronic equipment during the communication session based at least in part on the UPnP session key, wherein the program utilizes network translation to facilitate communication between the one or more associated devices on the local area network and the one or more associated electronic equipment on the wide area network.

7. A communication method that enables a mobile device to join a local area network that utilizes a universal plug and play (UPnP) protocol, the method comprising:

providing a network communication device that includes a UPnP interface, an Internet Protocol multimedia subsystem (IMS)interface and circuitry coupled to the UPnP interface and the IMS interface, wherein the UPnP interface transmits and receives information related to one or more devices that form at least a portion of the local area network, wherein at least a portion of the local area network utilizes a UPnP protocol; and the IMS interface transmits and receives information related to the mobile device; and the circuitry associates a UPnP session key from the local area network with the mobile device to establish a communication session between the one or more devices on the local area network and the mobile device, and the circuitry provides network address translation to facilitate communication between the local area network and the associated wide area network;

registering the network communication device on the local area network;

obtaining a first unique address in the local area network, wherein the local area network includes one or more associated devices utilizing the UPnP protocol;

obtaining a second unique address in a wide area network associated with the mobile device, wherein the wide area network includes one or more devices utilizing the IMS protocol;

receiving a request for information from the mobile device for access to one or more of the devices on the local area network;

authenticating the request by one or more devices coupled to the local area network;

establishing the UPnP session key related to the request for information, wherein the UPnP session key is generated by one or more devices coupled to the local area network; and associating the UPnP session key with the mobile device to facilitate communication between mobile device and the one or more devices on the local area network.

8. The method of claim 7 further including translating at least a portion of the information requested from the one or more devices on the local area network for use by the mobile device.

9. The method of claim 8, wherein the step of translating includes translating an address associated with the one or more associated devices to a second address for use by the associated electronic equipment.

10. The method of claim 7 further including transmitting at least a portion of the information requested from the one or more devices on the local are network through the network communication device to the mobile telephone.

11. The method of claim 10 further including encrypting at least the portion of the information transmitted.

12. The method of claim 7 further including parsing the request to determine a requested service desired by the mobile telephone.

13. The method of claim 7 further including converting a format associated with information stored on the one or more of the devices on the local area to another format for operation on the mobile telephone.

* * * * *